(12) United States Patent
McLaughlin et al.

(10) Patent No.: US 7,367,634 B2
(45) Date of Patent: May 6, 2008

(54) RELAY CONFIGURATION FOR AN ELECTRO-PNEUMATIC TRAIN

(75) Inventors: Bryan McLaughlin, Watertown, NY (US); James R. Truglio, Watertown, NY (US); Eric Wright, Evans Mill, NY (US)

(73) Assignee: New York Air Brake Corporation, Watertown, NY (US)

( * ) Notice: Subject to any disclaimer, the term of this patent is extended or adjusted under 35 U.S.C. 154(b) by 38 days.

(21) Appl. No.: 11/676,797

(22) Filed: Feb. 20, 2007

(65) Prior Publication Data

US 2007/0159000 A1 Jul. 12, 2007

Related U.S. Application Data

(62) Division of application No. 11/020,120, filed on Dec. 27, 2004.

(51) Int. Cl.
*B60T 17/06* (2006.01)

(52) U.S. Cl. ............................................. 303/7; 303/15

(58) Field of Classification Search .................... 303/3, 303/7, 28, 86, 127, 128, 15
See application file for complete search history.

(56) References Cited

U.S. PATENT DOCUMENTS 4,052,110 A * 10/1977 Banker ........................ 303/36
5,730,504 A * 3/1998 Gaughan ....................... 303/3
5,887,953 A * 3/1999 Wood et al. .................. 303/7
5,984,426 A * 11/1999 Hart ............................. 303/15
6,238,010 B1 * 5/2001 Barber et al. ................. 303/7
6,457,782 B1 * 10/2002 Truglio et al. ................ 303/7
6,676,229 B1 * 1/2004 Marra et al. .................. 303/7
6,769,744 B2 * 8/2004 Marsh et al. ................. 303/40

* cited by examiner

*Primary Examiner*—Chris Schwartz
(74) *Attorney, Agent, or Firm*—Barnes & Thornburg LLP

(57) ABSTRACT

A relay valve configuration which can be used with various cars in an electropneumatic train and under the control of one of the electropneumatic brake control valves. The improved brake control valve includes a relay valve mounted at an interface of the manifold. The valve has a source inlet connected to the reservoir interface port, an inlet connected to atmosphere, an outlet connected to the brake cylinder interface port and a control inlet connected to the exhaust interface port. The valve is responsive to the control inlet connected to the exhaust interface port to selectively connect the brake cylinder interface port either to the reservoir interface port or atmosphere. The exhaust interface port in AAR is known as the retainer port. A check valve/choke is also mounted on the manifold of the interface and is in the same housing as the relay valve.

9 Claims, 6 Drawing Sheets

RELAY CONFIGURATION FOR AN ELECTRO-PNEUMATIC TRAIN

CROSS REFERENCE

This application is a divisional and claims priority to U.S. patent application Ser. No. 11/020,120 filed Dec. 27, 2004.

BACKGROUND AND SUMMARY OF THE DISCLOSURE

The present invention relates generally to electropneumatic ("EP") brake control valves and, more specifically, to a relay valve for use in an electropneumatic train.

Electropneumatic brake control valves are well known in the passenger railroad art and the mass transit railroad art. Because the trains are short and are not involved generally in a mix and match at an interchange of different equipment, the ability to provide pneumatic and electrical control throughout the train has been readily available in the passenger and the mass transit systems. In freight trains, the trains may involve as much as 100 cars stretching over one mile or more. The individual cars may lay idle in harsh environments for up to a year without use. Also, because of the long distance they travel, the cars are continuously moved from one consist to another as it travels to its destination. Thus, the use of electropneumatic-pneumatic valves in the freight trains has been very limited.

Recently, the American Association of Railroads ("AAR") has been testing and experimenting with the incorporation of electropneumatic valves on the cars of a freight train. Various systems exist in the industry for adaptation of existing pneumatic brake control valves, as well as standalone electropneumatic brake control valves.

An example of an adaptation of a standard AAR brake control valve is illustrated in U.S. Pat. No. 5,393,129 to Troiani et al. Troiani et al. provides an overlay at the connection of the pneumatic system to the pipe bracket. An electropneumatic valve system is connected to the emergency reservoir between the retainer port of the pipe bracket and the retainer. The service valve portion remains in its release position, which allows transmission of the brake control signal from the electropneumatic brake control valve through the service portion to the brake cylinder.

Various configurations of electropneumatic brake control valves mounted to a standard pipe bracket are illustrated in U.S. Pat. No. 6,325,464 to Truglio et al.

Although the technology for electropneumatic brake control valves has been implemented and accepted, there is still a cost factor in installing an electropneumatic-controlled device on each railroad car.

The present disclosure provides a relay valve configuration as a pneumatic brake control valve which can be used with various cars in an electropneumatic train and under the control of one of the electropneumatic brake control valves. This reduces the number of electropneumatic brake control valves. The improved brake control valve includes a relay valve mounted at an interface of the manifold. The valve has a source inlet connected to the reservoir interface port, an inlet connected to atmosphere, an outlet connected to the brake cylinder interface port and a control inlet connected to the exhaust interface port. The valve is responsive to the control inlet connected to the exhaust interface port to selectively connect the brake cylinder interface port either to the reservoir interface port or atmosphere. The exhaust interface port in AAR is known as the retainer port. A check valve/choke is also mounted on the manifold at the interface and is in the same housing as the relay valve.

Also, connected to the manifold is a bypass plate or a vent valve structure, which includes a passage connecting the two brake cylinder ports, which are normally used for the emergency brake portion.

In the brake system for a train, there are at least two brake control valves. At least one of the valves is the pneumatic brake control valve, including the relay valve previously described. A pipe connects the brake cylinder port of the first brake control valve to the exhaust port of the second control valve so as to control the vent valve with the brake cylinder pressure. The first brake control valve is an electropneumatic brake control valve. The train may include a plurality of brake control valves, including the vent valve previously described, and a single electropneumatic brake control valve can control more than one of the second style brake control valve through its exhaust port.

These and other aspects of the present disclosure will become apparent from the following detailed description of the disclosure, when considered in conjunction with accompanying drawings.

DETAILED DESCRIPTION OF THE PREFERRED EMBODIMENTS

Figure 1:
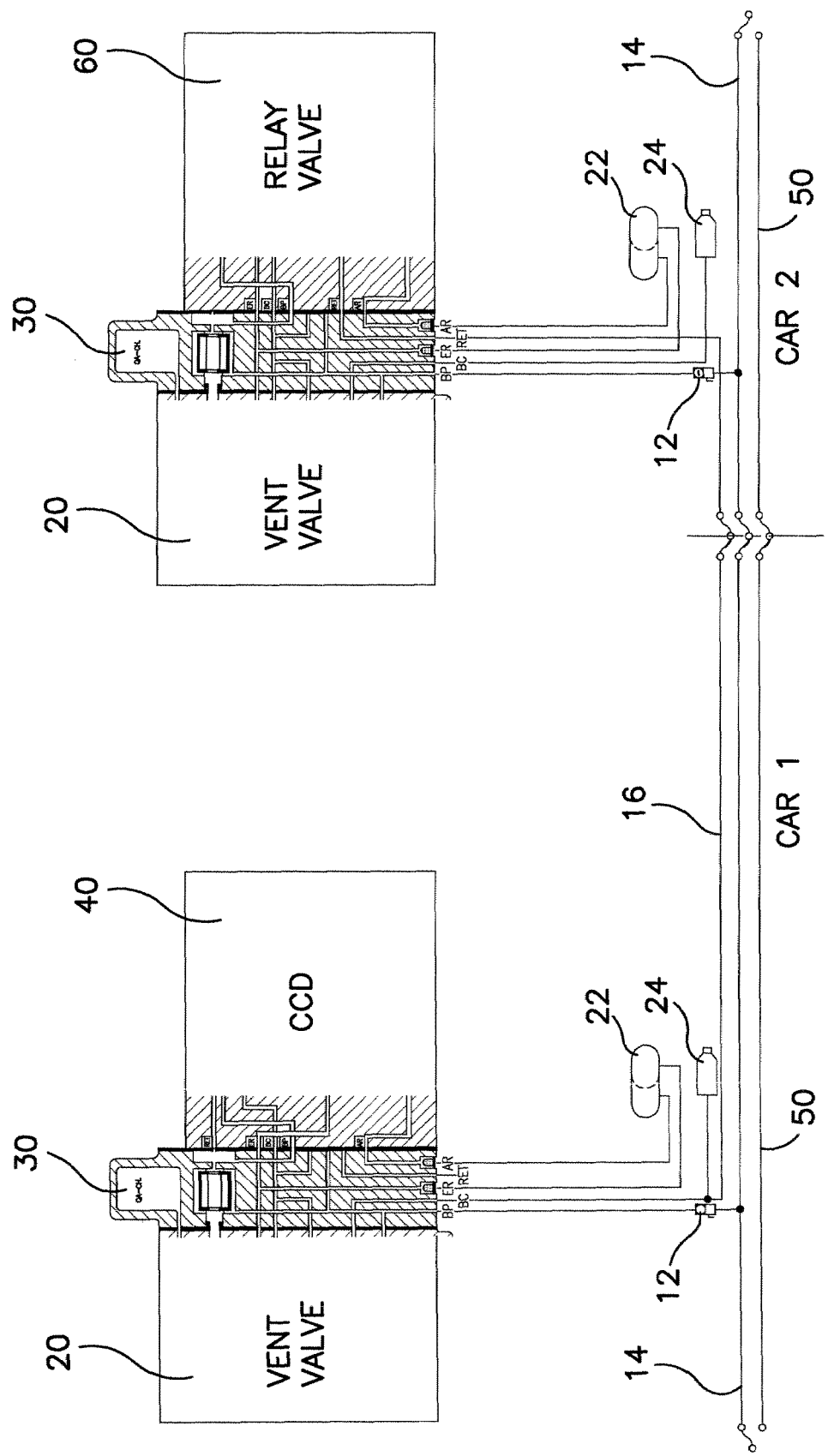
FIG. 1 is a schematic of an electropneumatic train incorporating electropneumatic and pneumatic brake control valves according to the present disclosure.

As shown in FIG. 1, two cars are interconnected by a brake pipe 14 and an electrical train line 50, which carries power and communication signals to the various electropneumatic brake control valves. An additional pipe 16 connects the first and second cars. As will be described below, pipe 16 is either a new pipe or an existing pipe within the train. Various trains have a holding brake pipe, which is not used in the present electropneumatic brake control systems and, therefore, is available. Each of the cars includes a standard manifold 30 connected via cut-off valve 12 to the brake pipe 14. A pair of reservoirs 22 are also connected to the manifold 30, as is the brake cylinder 24. The standard inlet ports of the manifold 30 are brake pipe BP, brake cylinder BC, emergency reservoir ER, auxiliary reservoir AR and an exhaust/retainer port RET.

On car 1, an electropneumatic brake control valve 40 is mounted on the service interface for the pipe bracket 30. These devices are known in the industry as car control devices ("CCDs"). Mounted on the emergency interface is a vent valve 20.

Figure 2:
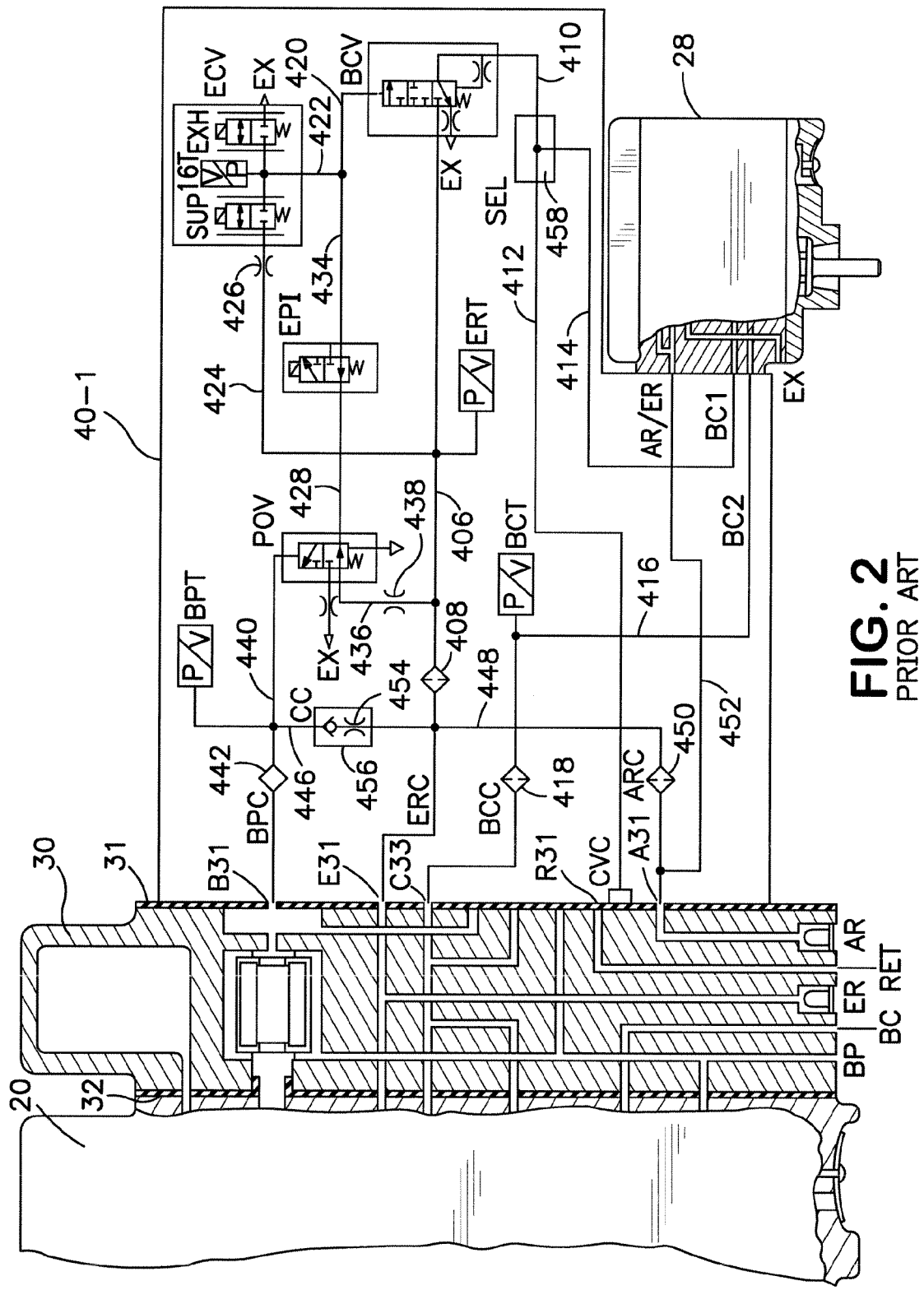
FIG. 2 is an example of an electropneumatic brake valve according to the prior art.
Figure 4:
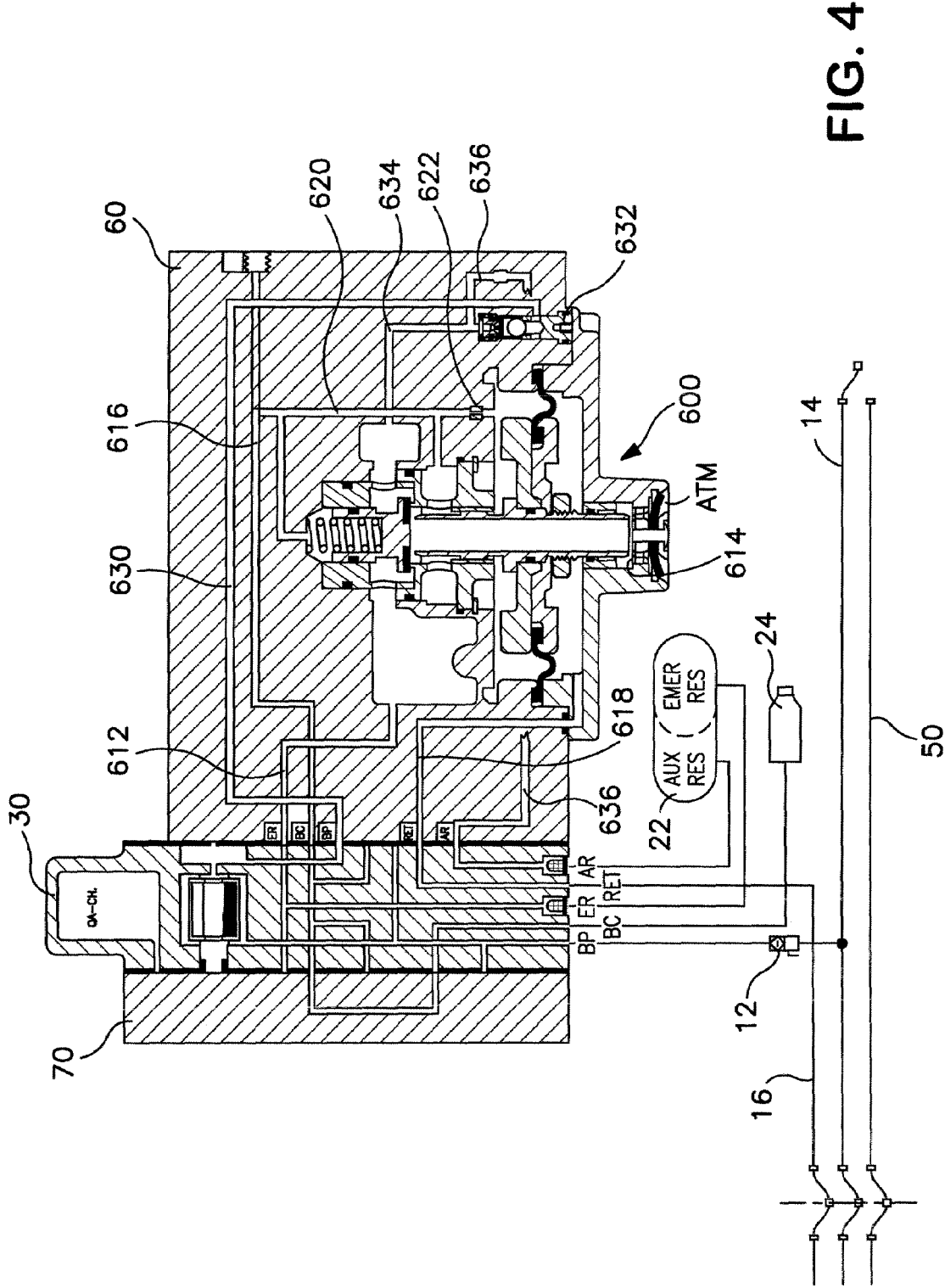
FIG. 4 is a cross-sectional view of the relay valve of the schematic of FIG. 3.

Car 2, on its standard bracket 30, includes a relay valve 60. It may also include a vent valve 20, as illustrated in FIGS. 1 and 2, or may include a bypass plate 70, as illustrated in FIG. 4. The relay valve 60, as shown below, is a pneumatic valve and not an electropneumatic valve.

Pipe 16 connects the brake cylinder port BC of the first car's electropneumatic brake control valve to the exhaust or retainer port RET of the pneumatic brake control valve of the second car. As will be described below, this is the control input to the relay valve 60. In response to the control signal on port RET, the relay valve 60 connects the reservoir 22 or atmosphere to the brake cylinder 24 to control the brakes on the second car. Thus, the pneumatic brake control valve of the second car is a pneumatic valve controlled by the electropneumatic valve of the first car.

Figure 5:
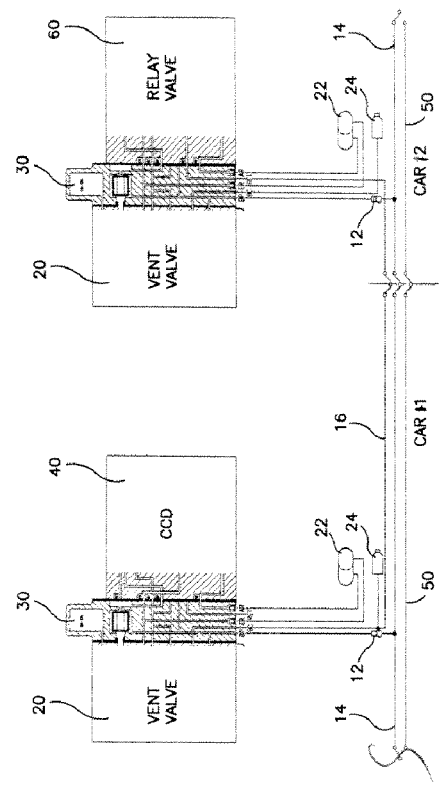
FIG. 5 is a schematic of an electropneumatic train incorporation pairs of electropneumatic and pneumatic brake control valves according to the present disclosure.
Figure 5:
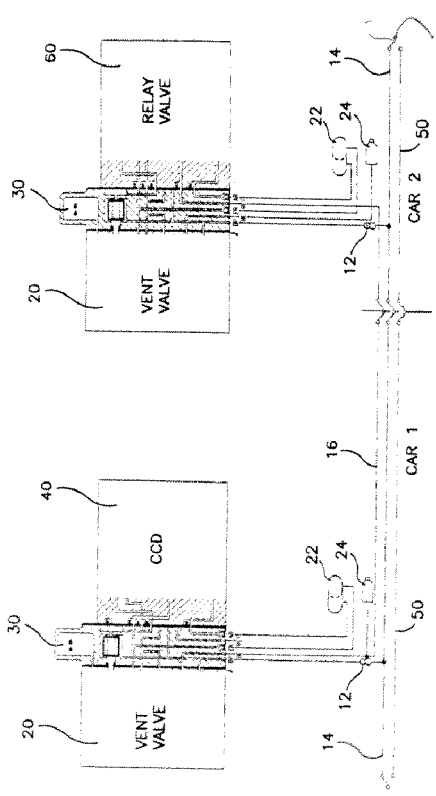
Figure 6:
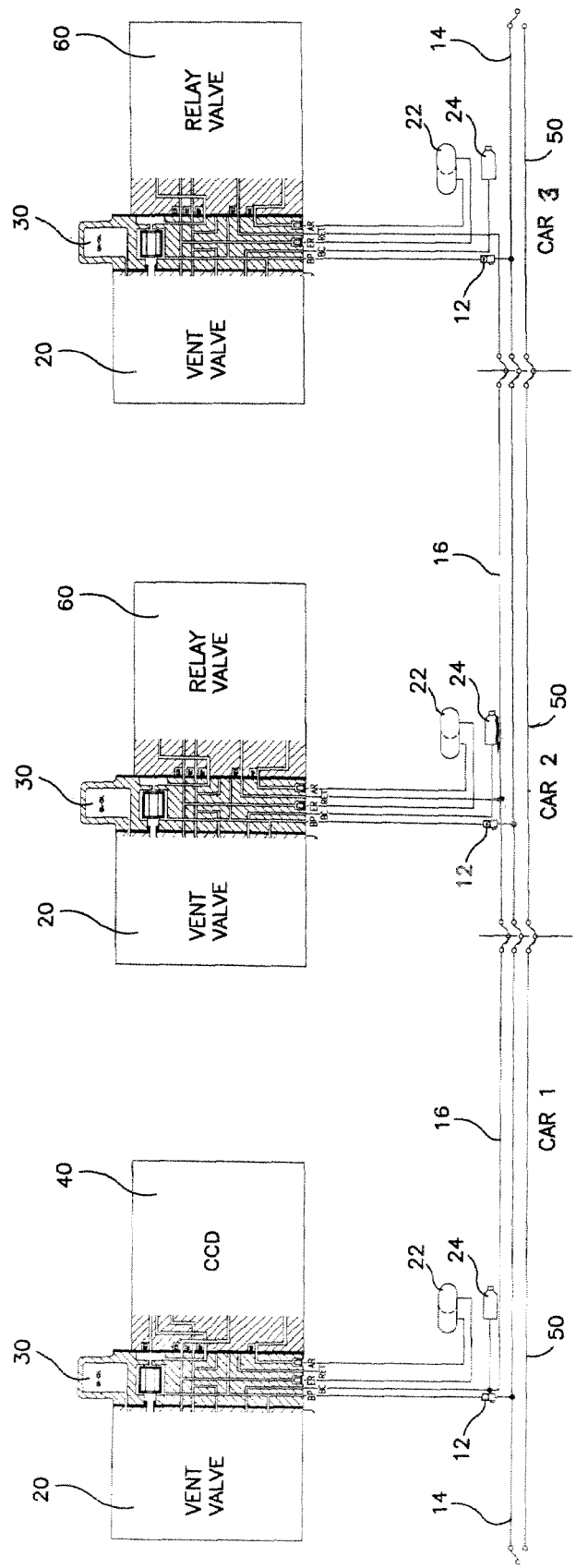
FIG. 6 is a schematic of an electropneumatic train incorporating an electropneumatic brake control valve and a pair of pneumatic brake control valves according to the present disclosure.

Although only a single pair of brake control valves is illustrated in FIG. 1, the train may include a plurality of pairs of interconnected electropneumatic brake control valves and pneumatic brake control valves as shown in FIG. 5. Also, a single electropneumatic brake control valve can be connected to multiple pneumatic brake control valves having the structure of the second car as shown in FIG. 6. This combination reduces the cost in that a fewer number of electropneumatic brake control valves can be used. Also, existing cars having only pneumatic brake control valves can be easily retrofitted with minimum change. The relay valve 60 is mounted to the pipe bracket 30 without modification to the interface and uses existing studs and gaskets at the service portion interface of the standard pneumatic brake control valve. It should also be noted that even though the vent valves 20 are shown mounted at the emergency interface, which is opposite the service interface, the emergency and service interface may be on a common side known in the industry as a single-sided bracket. As will be noted below, the relay valve 60 includes a combination check valve and charging choke to allow the brake pipe 14 to charge the reservoirs 22.

The details of a CCD 40 of the prior art is illustrated in FIG. 2. This is from FIG. 2B of U.S. Pat. No. 6,325,464 and uses the same numbers. For details of the explanation of the operation, reference should be made thereto, and it will not be explained in detail here. This structure is also known as EP-60, which is available from New York Air Brake Corporation of Watertown, N.Y. The structure of vent valve 20 may be that shown in U.S. Pat. No. 6,318,812 to Newton et al. This vent valve is also available from New York Air Brake Corporation of Watertown, N.Y. However, it should be noted that other vent valves may be used or, as previously discussed with respect to the second car, the vent valve may just be a bypass plate, as illustrated in FIG. 4.

Figure 3:
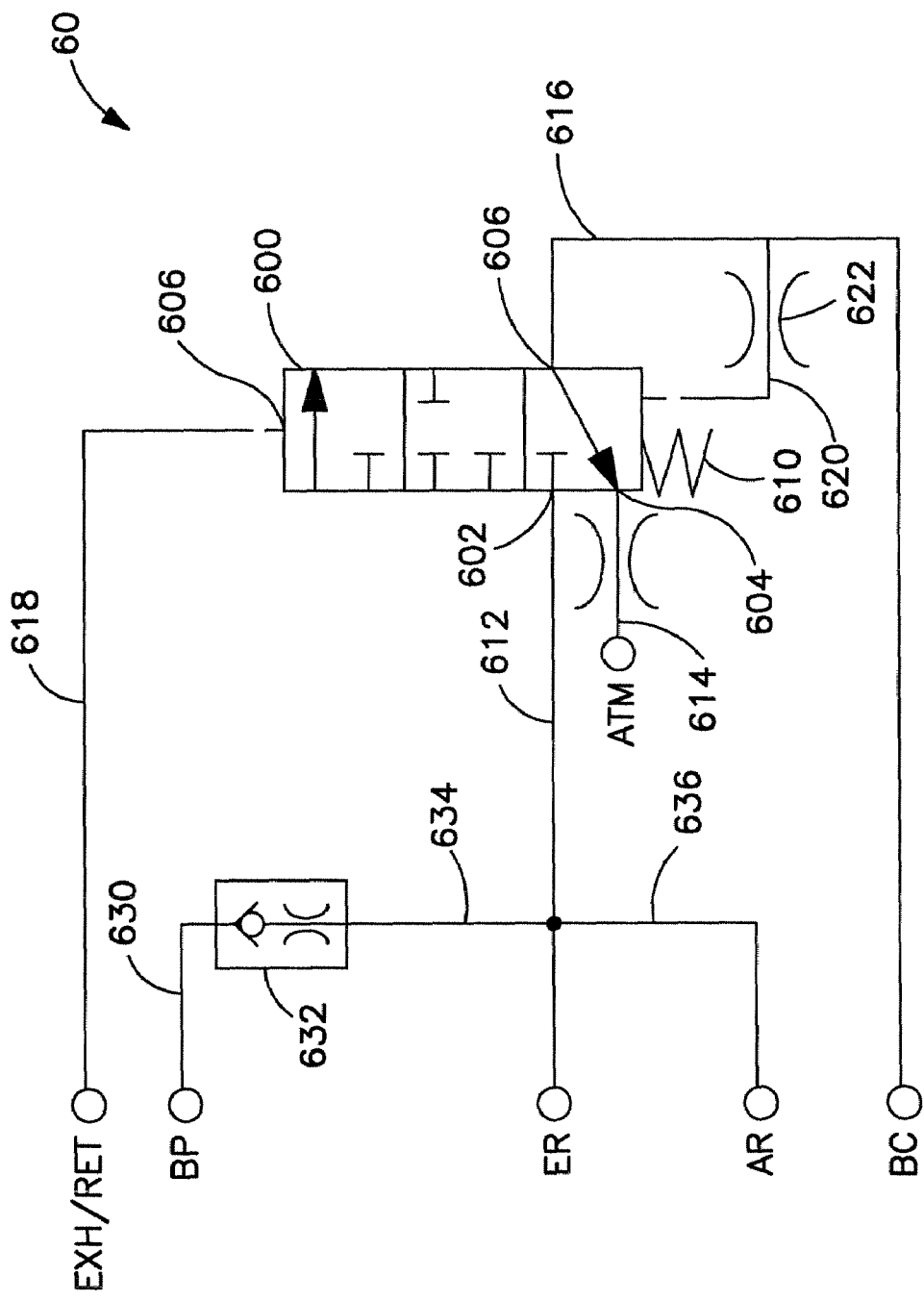
FIG. 3 is a schematic of the relay valve of FIG. 1.

A schematic of the relay valve 60 is illustrated in FIG. 3. The relay valve portion 600 includes a source input 602, atmospheric input 604, an output 606 and a control input or pilot input 608. The source input 602 is connected by passage 612 to the emergency reservoir ER and the auxiliary reservoir AR. Passage 614 connects the atmospheric input 604 to atmosphere ATM. The output 606 is connected by line 616 to the brake cylinder port BC. The pilot or control port 608 is connected to the exhaust or retainer port EXH/RET by passage 618. The output 606 is also connected via passages 616 and 620 as a feedback to the relay valve portion 600 through restriction 622. The relay valve portion 600 is biased by spring 610 to its release position illustrated in FIG. 3. In this position, the output 606 is connected to the atmosphere at input 604.

Upon receipt of a brake signal at 608, the valve portion 600 moves down to the topmost position, wherein the emergency and auxiliary reservoirs are connected at 602 to the outlet 606. The pressure from the reservoirs is supplied through passage 616 to the brake cylinder port BC. It is also fed back via passage 620 to the relay valve 600. Once the pressure at the brake cylinder BC reaches substantially that of the pilot signal at 608, the pressure at 620 and the spring 610 moves the valve portion 600 to the middle lap position. In the lap position, the two inputs 602 and 604 are disconnected from the output 606, which is now lapped or sealed. This holds the brake cylinder pressure.

Once the control signal is removed from 608, the relay valve 60 moves upward out of its lap position towards the release position. The atmospheric input 604 is connected to the output 606, thereby connecting the brake cylinder port BC to atmosphere. This releases the brake. This is a standard operation of a relay valve.

A passage 630 connects the brake pipe port BP to check valve/choke 632. Passages 634 and 636 connect the check valve/choke 632 to the emergency and auxiliary reservoirs ER/AR. This allows charging of the reservoirs from the brake pipe. The relay valve 600 and the check valve/choke 632 are all in a common housing of the relay valve 60. The relay valve portion 600 is equivalent to the BC valve in FIG. 2 of the prior art.

A specific implementation of the relay valve 60 is shown in FIG. 4. The same numbering is used as in the schematic of FIG. 3. The relay valve portion 600 may be the same relay valve portion used in the CCD 40 of FIG. 1 and is connected to the interface ports ER, BC, BP, RET, AR at the service interface. Also, illustrated is the bypass plate 70 connecting the two brake cylinder ports on the emergency interface of the pipe bracket 30 to the brake cylinder port BC. Operation of the relay valves is well known, and a detailed explanation is not needed.

The manifold 30 may be any standard manifold (for example, an AB, ABD, ABDW, ABDX or a DB manifold). These are all interchangeable, as required by AAR. It should also be noted that even though this system has been designed for AAR railroads, it is equally applicable to non-AAR countries and standards.

Although the present disclosure has been described and illustrated in detail, it is to be clearly understood that this is done by way of illustration and example only and is not to be taken by way of limitation. The scope of the present disclosure is to be limited only by the terms of the appended claims.

What is claimed:

1. A brake system for a train comprising:

at least first and second brake control valves;

each brake control valve having a manifold which includes a brake pipe port, a reservoir port, and a brake cylinder port connected respectively to a brake pipe, a corresponding reservoir and a corresponding brake cylinder; and a pipe fluidically connecting the brake cylinder port of the first brake control valve's manifold to an exhaust port of the second control valve's manifold external to the manifolds.

2. The brake system according to claim 1, wherein the first brake control valve is an electropneumatic brake control valve.

3. The brake system according to claim 2, wherein the pipe connecting the brake cylinder port of the first brake control valve to the exhaust port of the second control valve is a hold brake pipe of the train.

4. The brake system according to claim 2, including a third brake control valve similar to the second control valve and the exhaust port of the third control valve is connected to the brake cylinder port of the first brake control valve.

5. The brake system according to claim 2, including a plurality of pairs of first and second brake control valves and the exhaust port of the second control valve of each pair is connected to the brake cylinder port of the first brake control valve of that pair.

6. The brake system according to claim 1, including a third brake control valve similar to the second control valve and the exhaust port of the third control valve is connected to the brake cylinder port of the first brake control valve.

7. The brake system according to claim 1, including a plurality of pairs of first and second brake control valves and the exhaust poll of the second control valve of each pair is connected to the brake cylinder port of the first brake control valve of that pair.

8. The brake system according to claim 1, wherein at least one of the first and second brake control valves includes a vent valve mounted to its manifold and responsive to pressure on the brake pipe port to vent the brake pipe.

9. The brake system according to claim 1, wherein the first and second brake control valves are on adjacent cars on the train.

* * * * *